United States Patent [19]

Eckle et al.

[11] 4,066,376

[45] Jan. 3, 1978

[54] TURNING TOOL WITH INTERCHANGEABLE POLYGONAL CUTTING INSERT

[75] Inventors: Otto Eckle; Hermann Stahl, both of Loechgau, Germany

[73] Assignee: Komet Stahlhalter- und Werkzeugfabrik, Robert Breuning GmbH, Besigheim, Germany

[21] Appl. No.: 654,760

[22] Filed: Feb. 3, 1976

[30] Foreign Application Priority Data

Feb. 19, 1975 Germany .................. 7504960[U]

[51] Int. Cl.² ............................................. B26D 1/00
[52] U.S. Cl. ....................................... 407/101; 407/103
[58] Field of Search ................... 29/96, 98, 101, 102 R

[56] References Cited

U.S. PATENT DOCUMENTS

| | | | |
|---|---|---|---|
| 3,102,326 | 9/1963 | Conti et al. | 29/96 |
| 3,271,842 | 9/1966 | Breuning | 29/96 |
| 3,341,923 | 9/1967 | Kelm | 29/96 |
| 3,500,523 | 3/1970 | Cashman et al. | 29/96 |
| 3,577,618 | 5/1971 | Cashman | 29/96 |

*Primary Examiner*—Leonidas Vlachos
*Attorney, Agent, or Firm*—Blanchard, Flynn, Thiel, Boutell & Tanis

[57] ABSTRACT

A turning tool for use in metal machining having a holder with a first recess for receiving an insert carrier therein. The insert carrier has a second recess for receiving a cutting insert therein. The insert carrier has a planar base face and a generally semicylindrical supporting surface engaging a corresponding semicylindrical support surface in the first recess on the holder. Holding screws are provided for securing the insert carrier to the holder and for securing the cutting insert to the insert carrier. The semicylindrical support surface on the insert carrier is continuous over the side edge thereof and the corresponding semicylindrical support surface in the recess on the holder are both continuous from a base surface to simplify the machining thereof. In addition, the support surfaces effect a good transmitting of forces between the respective components to enhance the durability of the tool.

3 Claims, 10 Drawing Figures

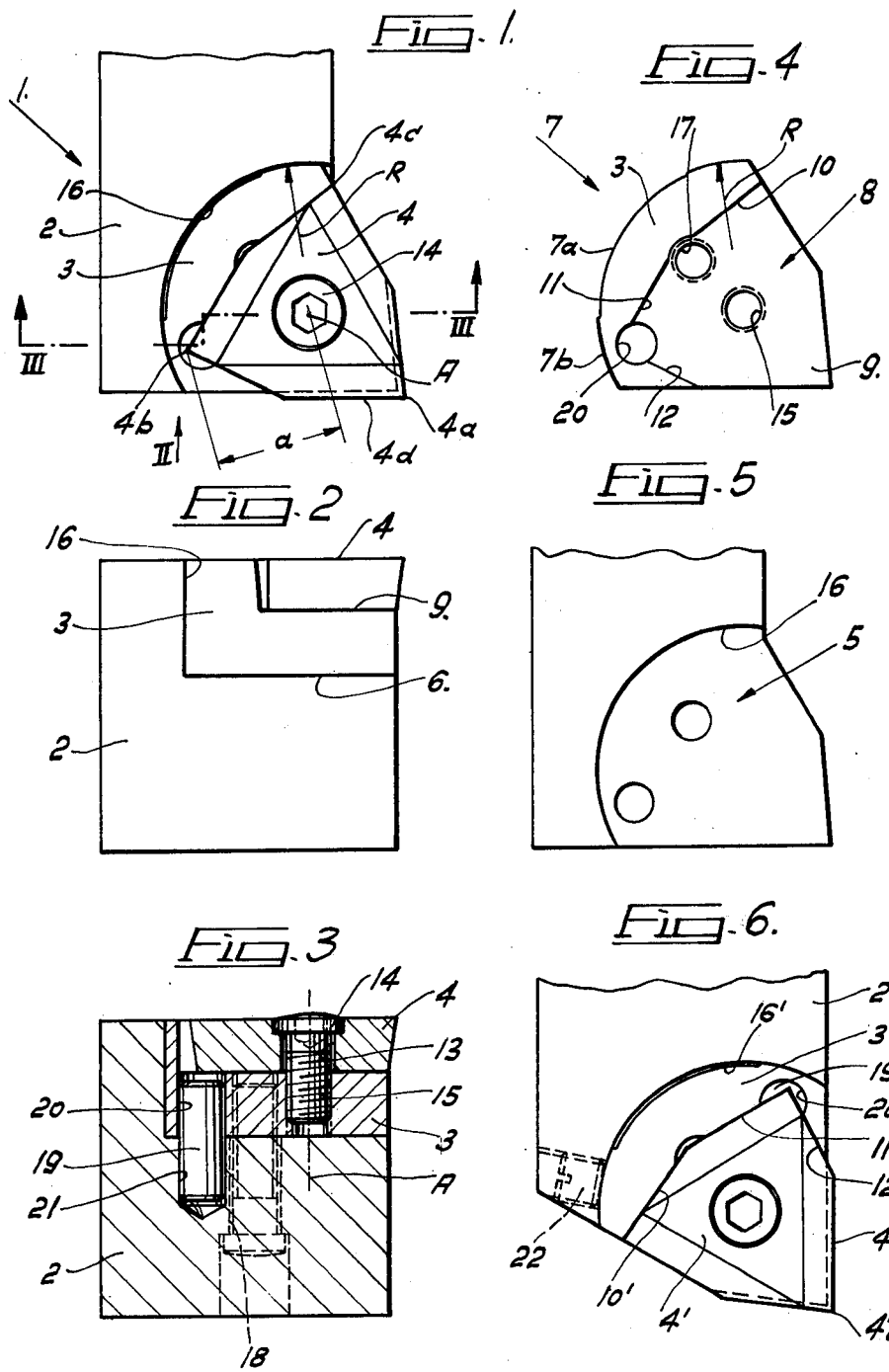

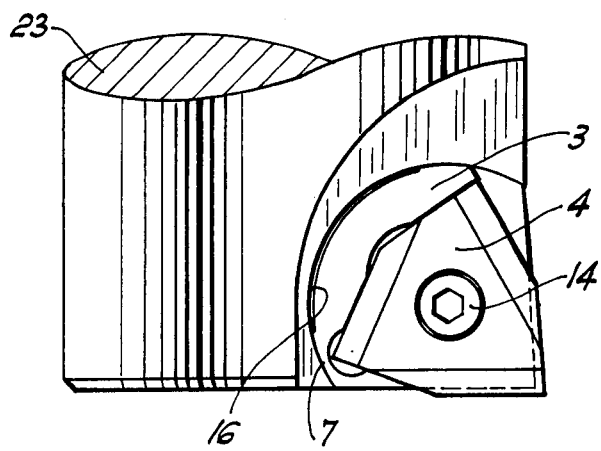
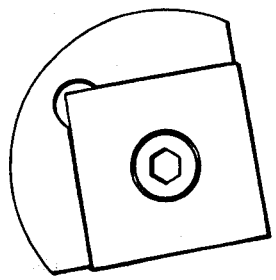
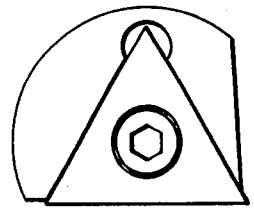
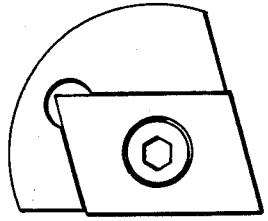

TURNING TOOL WITH INTERCHANGEABLE POLYGONAL CUTTING INSERT

FIELD OF THE INVENTION

The invention concerns a turning tool with interchangeable cutting insert, particularly for metal machining, comprising a holder having a recess, an insert carrier inserted in the recess and fixed there by means of a holding screw, the insert carrier having a recess for the cutting insert, which is supported on a seating surface and against at least two bearing surfaces of the carrier recess, and is held in the recess by means of a clamping screw, the insert carrier having a plane base surface and on its side turned away from the effective cutting point having extending at right-angles to the base surface an approximately semicylindrical supporting surface, by means whereof it is supported on corresponding countersurfaces of the holding recess.

BACKGROUND OF THE INVENTION

In the case of interchangeable cutting inserts, generally consisting of tungsten carbide, it is important that on their side turned away from the effective cutting edge, they are supported on the holder over the widest possible surface. For this reason, on the holder or on an insert carrier inserted in the holder, there are provided at least two bearing surfaces extending at an angle to each other. In the hexagonal cutting inserts, as frequently employed, which have an angle of somewhat less than 90° at every other corner, it would be desirable for ensuring a non-rotational and dimensionally accurate seating if these cutting inserts were supported on three bearing faces. The maximum importance should be given to a satisfactory support in order, on the one hand, to fix the cutting insert in a dimensionally exact manner with respect to the holder, and on the other hand, to ensure transmission of the forces set up in machining from the cutting insert to the holder, without at the same time damaging the unused cutting edges. The production of these bearing faces which must not only extend at an angle to each other corresponding to the outer contour of the cutting insert, but also exactly at an angle determined by the shape of the cutting insert with respect to the seating surface, requires expensive special machine tools. In the case of complicated tools, the production of the bearing faces encounters difficulties if there is little room and there are no orientation points for dimensionally correct positioning of the cutting insert. Frequently, the user of the turning tools would also like to make for himself the actual tool holders, such as turning tool holders, boring tool holders, drill heads and other special tools and fix on these holders merely the cutting inserts made by another firm. This, however, has hitherto scarcely been possible owing to the bearing faces being difficult to make.

It is true that a turning tool of the above-mentioned kind is known, in which the cutting insert is secured not directly to the holder but to an insert carrier insertable in the holder. The insert carrier has the accurately machined bearing faces for the cutter insert. Its external form, however, is of such a shape that the necessary recess for the insert is simpler to make on the holder. A known insert carrier has a substantially U-shaped contour. Two mutually parallel lateral faces are connected together by a semicylindrical supporting surface. On its underside the insert carrier has a plane base face. By means of an end-milling cutter a recess for receiving the said insert carrier can be made in the holder with comparative ease. This known insert carrier, however, cannot be used in many cases since its external dimensions are too large compared with the cutting insert. This is to be attributed chiefly to the fact that the cutting insert is held on the insert carrier by means of a clamping claw, which is supported by its front end on the cutting insert and by its rear end on the insert carrier. For accommodating this clamping claw and a clamping screw holding the clamping claw, the insert carrier must be made correspondingly large. Owing to its external dimensions, the known insert carrier also requires a comparatively large recess, resulting in considerable weakening of the holder. For this reason also, this known insert carrier often cannot be used.

Another turning tool is also known (from U.S. Pat. No. 2,630,725), in which the insert carrier in plan has a substantially rectangular shape. The cutting insert is fixed at one corner of this rectangle by means of a clamping screw inserted in a central bore of the cutting insert. In the region of the diagonally opposite corner, the insert carrier has a screwthread for screwing in a holding screw, by means of which it is fixed to the holder. This known insert carrier also has the disadvantage that it requires comparatively much room, added to which is the fact that the rectangular recess necessary for its accommodation in the holder is difficult to make.

It is the object of the invention to provide a turning tool having a replaceable polygonal cutting insert of the type referred to in the foregoing, in which the insert carrier has the smallest possible dimension and the recess necessary for it in the holder is simple to make.

This is achieved according to the invention in that the cutting insert, in the manner known per se, has a central bore for the clamping screw, the axis of the semicylindrical supporting surface coincides completely or approximately with the axis of the central bore and a screwthread or a bore for the holding screw is provided in the insert carrier below the cutting insert. Preferably, the radius of the supporting surface is only slightly larger than the distance of the cutting points from the axis of the central bore.

In the turning tool according to the invention, the insert carrier has particularly small dimensions. In the cutting plate plane, it is scarcely larger than the cutting insert itself. Below the cutting insert, it has a height, corresponding approximately to the height of the cutting insert. Since however, in most turning tools, shim plates are provided in any case between the holder and cutting insert, the space requirement of the cutting insert and the insert carrier in the case of the turning tool according to the invention is only slightly greater than the space requirement of a cutting insert with a shim plate. Owing to its small space requirement, the insert carrier can be used practically everywhere, where hitherto the cutting insert has been mounted directly in the holder. The simple external contour of the insert carrier with an approximately semicylindrical supporting surface and plane base face requires in the holder a recess which can be made very simply by means of an end miller. For this reason, the users of turning tools can make these themselves if necessary. They merely order from another manufacturer the cutting plates and insert carriers which can then be made by means of suitable special machines with high accuracy, and since they have always the same form, independently of the particular turning tool, they can be made in large numbers.

A particularly advantageous embodiment of the turning tool according to the invention is that the insert carrier has a fixing bore extending perpendicularly to its base face for a fixing pin engaging the fixing bore and a corresponding bore of the holding recess. By means of this fixing pin, the insert carrier is fixed exactly relative to the holder and rotation or displacement of the insert carrier relative to the holder is avoided.

Further advantageous embodiments are characterised in the sub-claims.

BRIEF DESCRIPTION OF THE DRAWINGS

The invention is described more particularly in the following with reference to a number of embodiment examples represented in the drawings, in which:

FIG. 1 shows a facing tool in plan,

FIG. 2 shows the end view of the facing tool viewed in the direction II of FIG. 1, FIG. 3 is a cross-section on the line III—III of FIG. 1, FIG. 4 is a plan of the insert carrier, FIG. 5 is a plan of the holder, FIG. 6 shows a second embodiment example of a facing tool, FIG. 7 shows a drilling rod in plan, FIGS. 8 to 10 show different insert carriers with other polygonal cutting inserts.

DETAILED DESCRIPTION

In the drawings, 1 denotes the entire turning tool, comprising a holder 2, an insert carrier 3 and a cutting insert 4 of tungsten carbide or the like. For receiving the insert carrier, the holder 2 has a recess 5, into which the insert carrier 3 fits exactly. The insert carrier has a plane base 5 and extending perpendicularly to the latter an approximately semicylindrical supporting surface 7. The angular range over which this approximately semicylindrical supporting surface extends depends essentially on the shape of the cutting inserts. In the case of the hexagonal cutting inserts shown in FIGS. 1 to 7 and the parallelogram-shaped cutting insert shown in FIG. 9, it is about 135°, while in the case of the rectangular or triangular cutting inserts shown in FIGS. 8 to 10, it is about 160°. The term "approximately semicylindrical" should therefore also cover an angular range of between approximately 135° and 160°. The insert carrier 3 furthermore has a recess 8 for receiving the cutting insert 4. This recess is bounded by the seating face 9 and the bearing faces 10, 11 and 12. The cutting insert 4 is supported on these faces. It has a central bore 13 and by means of a clamping screw 14 screwed into a thread 15 of the insert carrier 3 it is held against the latter. The axis of the semicylindrical supporting surface 7 and the axis A of the central bore 13 in the embodiment examples shown coincide or should coincide at least approximately. To attain the smallest possible overall dimensions, it is furthermore advantageous if the radius R of the supporting surface 7 is only slightly greater than the distance $a$ of the cutting tips 4a, 4b, 4c from the axis of the central bore. The counter-face 16 provided in the holder 2, on which face the supporting surface 7 is supported, has the same radius as the supporting surface. To ensure good application, it is advantageous if the supporting surface 7 in its central region 7a has a somewhat smaller radius than at its outer regions 7b, so that it bears only with its outer regions against the counter-surface 16 of the holder recess 5.

For securing the insert carrier 3 to the holder 2, the latter has a screwthread 17 for a holding screw 18 inserted into the holder 2 from below. This screwthread 17 is provided below the cutting insert 4 so that the insert carrier 3 has the smallest possible dimensions. The holding screw 18 holds the insert carrier 3 permanently on the holder 2, so that when replacing or changing round the cutting insert 4, the insert carrier always remains fixed with respect to the holder.

If necessary, it would also be conceivable for the insert carrier to have a bore co-axial with the central bore of the cutting insert and the holder to have for this purpose a co-axial screwthread for screwing in a holding screw, passing through the cutting insert and the insert carrier. In this case, a single screw then serves for fixing both the cutting insert and the insert carrier. Advantageously, for fixing the insert carrier 3 exactly in its position with respect to the holder 2, the fixing pin 19 is provided. For receiving this fixing pin, the insert 3 has a fixing bore 20 extending at right-angles to its base surface 6, and the holder 2 is provided with a corresponding co-axial bore 21. Preferably, the bore 21 in the holder is made by first fixing the insert carrier 3 with the holding screw 18 on the holder 2, and then using the already predrilled fixing bore 20 as boring gauge for making the bore 21. In an insert carrier, as represented in FIGS. 1 to 6, for receiving a hexagonal cutting insert, in which every other corner includes an angle of somewhat less than 90°, the fixing bore 20 is preferably provided at the point of intersection of two fitting faces 11 and 12, which include an angle of somewhat less than 90°. In this case, the fixing bore 20 serves at the same time as free bore for the corner between the fitting faces 11 and 12, so that the cutting tip 4b is exposed. By means of the fixing pin 19, the insert carrier 3 even under high stress is always fixed in its position with respect to the holder, so that the cutting insert always retains its predetermined position.

If necessary, the fixing pin may also serve additionally as pivot permitting fine adjustment of the insert carrier 3' and cutting insert 4'. This is shown in FIG. 6 in the case of the turning tool. By means of the adjusting screw 22, the insert carrier 3' can be adjusted round the fixing pin 19' in a limited range. Since this adjustment occurs at the most in the range of tenths of a millimeter and only serves to correct discrepancies in fitting in the case of high accuracy requirements, it is permissible to deform the fixing pin 19' elastically, if the insert carrier 3' in the vicinity of the fixing pin already bears against the counterface 16'. By these means, a particularly exact adjustment without play is made possible.

If the insert carrier 3 of FIG. 1 is compared with the insert carrier 3' of FIG. 6, it will be seen that in each case two bearing faces 10, 11 or 10', 11' are situated opposite the effective cutting point 4a or 4'a, while the third bearing face 12 or 12' is adjacent the effective cutting edge 4d or 4'd. In this way, the cutting insert 4 or 4' is best fixed with respect to the insert carrier 3 or 3' and the forces occurring are transmitted in the best possible manner to the insert carrier.

In the embodiment example shown in FIG. 7, the insert carrier 3 is mounted on a drilling rod 23. This figure is merely intended to show that the insert carrier, thanks to its small overall dimensions, can be used just as well in the case of boring heads and special turning tools.

FIGS. 8 to 10 show insert carriers for rectangular, parallologram-shaped and triangular cutting inserts.

These figures are intended to show that the invention can also be applied to other polygonal cutting inserts.

The embodiments of the invention in which an exclusive property or privilege is claimed are defined as follows:

1. In a turning tool having an interchangeable polygonally shaped cutting insert, particularly for metal machining, the improvement comprising:

a holder having a first recess therein;

an insert carrier received in said first recess and secured thereto by means of a holding screw, said insert carrier having a second recess therein for receiving said cutting insert therein;

first holding means for holding said cutting insert in said second recess, said insert carrier having a planar base face and a generally semicylindrical supporting surface extending at right-angles to said base face, said semicylindrical supporting surface extending continuously between said base face and an opposite face on said insert carrier on its edge facing away from an effective cutting point on said cutting insert, said base face and said semicylindrical supporting surface on said insert carrier being supported on correspondingly shaped counter-surfaces of said first recess, one of said counter-surfaces being a semicylindrical support surface, said insert carrier having a first threaded central hole therein for receiving said first holding means therein, the axis (A) of said semicylindrical supporting surface on said insert carrier coinciding generally with the axis (A) of said central hole, said semi-cylindrical supporting surface having a radius (R) only slightly greater than a distance (a) between said effective cutting point and said axis (A) of said central hole, said supporting surface on said insert carrier having in its central region a smaller radius portion than said radius (R), the circumferentially spaced portions of said supporting surface on said insert carrier having the larger radiused surface engaging said semicylindrically shaped counter-surface on said holder;

second holding means for holding said insert carrier to said holder in said first recess;

a second threaded hole in said insert carrier extending parallel to said first threaded hole and perpendicular to said base face, said first holding means comprising a first screw received in said first threaded hole, said second holding means comprising a second screw received in said second threaded hole;

said insert carrier having a fixing bore extending perpendicular to said base face and a fixing pin received in said fixing bore and a corresponding bore in said first recess, said fixing bore being provided at a point remote from said axis (A) of said semicylindrical supporting surface and at the point of intersection of two bearing faces which include an angle of somewhat less than 90°, said two bearing faces being provided opposite said effective cutting point with a third bearing face being provided adjacent an effective cutting edge.

2. A tool according to claim 1, wherein said cutting insert has a hexagonal shape and every other corner includes an angle somewhat less than 90° and wherein said insert carrier has three bearing faces.

3. A tool according to claim 1, wherein said semicylindrical supporting surface extends over an angular range of approximately 135° – 160°.

* * * * *